US011533259B2

(12) United States Patent
Boutros et al.

(10) Patent No.: US 11,533,259 B2
(45) Date of Patent: Dec. 20, 2022

(54) BUILDING A PLATFORM TO SCALE CONTROL AND DATA PLANE FOR VIRTUAL NETWORK FUNCTIONS

(71) Applicant: VMware, Inc., Palo Alto, CA (US)

(72) Inventors: Sami Boutros, Union City, CA (US); Jerome Catrouillet, Santa Clara, CA (US); Sri Mohana Singamsetty, Cupertino, CA (US)

(73) Assignee: VMware, Inc., Palo Alto, CA (US)

( * ) Notice: Subject to any disclaimer, the term of this patent is extended or adjusted under 35 U.S.C. 154(b) by 27 days.

(21) Appl. No.: 16/520,876

(22) Filed: Jul. 24, 2019

(65) Prior Publication Data
US 2021/0029031 A1 Jan. 28, 2021

(51) Int. Cl.
*H04L 45/74* (2022.01)
*H04L 12/66* (2006.01)
*H04L 45/586* (2022.01)

(52) U.S. Cl.
CPC .............. *H04L 45/74* (2013.01); *H04L 12/66* (2013.01); *H04L 45/586* (2013.01)

(58) Field of Classification Search
CPC ................................ H04L 45/00; H04L 12/00
See application file for complete search history.

(56) References Cited

U.S. PATENT DOCUMENTS

| 10,742,483 | B2* | 8/2020 | Li ........................ H04L 43/0811 |
| 2016/0226822 | A1* | 8/2016 | Zhang ..................... H04L 43/08 |
| 2017/0034129 | A1* | 2/2017 | Sawant .............. H04L 12/4633 |
| 2017/0317851 | A1* | 11/2017 | Xu ........................ G06F 9/45558 |
| 2018/0070262 | A1* | 3/2018 | Nakano ................. H04L 47/805 |
| 2018/0083968 | A1* | 3/2018 | Xu ....................... H04L 63/0892 |
| 2018/0191597 | A1* | 7/2018 | Nageshappa ........... H04L 43/08 |
| 2018/0302343 | A1* | 10/2018 | Lokman ................ H04L 41/122 |
| 2019/0075050 | A1* | 3/2019 | Tubaltsev ............... H04L 45/02 |
| 2019/0132252 | A1* | 5/2019 | Hyoudou ............ H04L 47/2483 |
| 2019/0149415 | A1* | 5/2019 | Pani .................... H04L 41/0873 370/254 |
| 2020/0120025 | A1* | 4/2020 | Voit ........................ H04L 45/74 |
| 2020/0244573 | A1* | 7/2020 | Cui ........................ H04W 4/50 |
| 2020/0314006 | A1* | 10/2020 | Mackie ................... H04L 45/64 |

* cited by examiner

*Primary Examiner* — Jung H Park
*Assistant Examiner* — Sumitra Ganguly
(74) *Attorney, Agent, or Firm* — Dinsmore & Shohl LLP

(57) ABSTRACT

The present disclosure provides an approach for scaling the number of VNFs in a data center without scaling the number of control sessions between VNFs and a data center gateway. The approach includes opening a session between a VNF and a route server, rather than between the VNF and the gateway, when the VNF needs to send its connectivity information to the gateway. The VNF sends its connectivity information to the route server, and the route server forwards the connectivity information to the gateway. The gateway receives connectivity information of a plurality of VNFs in the data center from the route server rather than from each of the VNFs individually. The connectivity information is then used to send packets, by the gateway to a VNF, for processing. The packets are sent using three layers of networking: an underlay physical network, an overlay logical network, and a second overlay logical network.

15 Claims, 6 Drawing Sheets

BUILDING A PLATFORM TO SCALE CONTROL AND DATA PLANE FOR VIRTUAL NETWORK FUNCTIONS

BACKGROUND

A network service provider may provide network connectivity via a service provider network to one or more tenants, such as enterprises, corporations, etc. The service provider network may allow tenant devices outside of a tenant data center, such as tenant mobile devices communicating over a mobile network such as wireless wide area network (WWAN), to communicate with one or more tenant devices within the tenant data center. A tenant data center may include one or more devices connected by a network, such as a local area network (LAN). The tenant devices within the tenant data center and outside the tenant data center may be part of the same virtual tenant network, such as a virtual private network (VPN).

The network service provider may provide packet processing services for a virtual tenant network. For example, the network service provider processes packets for a virtual tenant network sent across the service provider network, such as between a tenant mobile device coupled to a mobile network and a device within the tenant data center. The processing can include tasks such as accounting, firewall filtering, parental control, quality of service (QoS), etc. The processing tasks are performed by packet processors (PPs).

Traditionally, PPs were standalone physical devices. More recently, the functionality of a PP has been virtualized as a virtual network function (VNF). Such a VNF may also be referred to as a virtual network appliance, a network service virtual machine, a virtual PP, etc. For example, the VNF may, in addition to other functions, provide functionality of a firewall, load balancer, intrusion detection/prevention system, etc. In addition, a VNF may actively redirect packets, drop packets, or modify packets in a manner that goes beyond the behaviors of standard Layer 2 and Layer 3 forwarding devices such as switches and routers, as further discussed herein. A VNF is software (e.g., virtual computing instance, virtual machine, etc.) that runs on standard, commodity computers, such as x86 architecture host computers. VNFs can be easily scaled to accommodate a higher throughput of packets moving through a service provider network. VNFs can also be migrated among host computers for load balancing.

The packet processing tasks are performed by VNFs within a data center of the network service provider accessible by other networks such as tenant data centers, mobile networks, etc., through a data center gateway. As new VNFs are created or existing VNFs are migrated between hosts in the data center, the VNFs need to update the gateway regarding their location (e.g., connectivity information including an address of the host running the VNF) within the data center. Further, as new devices/networks are assigned to a VNF, meaning the VNF acts as a gateway that performs packet processing for the devices/networks, the VNF needs to update the data center gateway regarding the connectivity information of the devices/networks. For example, the connectivity information may include addresses, such as IP addresses (e.g., of devices, subnets, etc.) such as within a virtual tenant network, network prefixes, virtual network identifiers (VNIs) of virtual tenant networks, etc., that correspond to multi-tenant routing information to provide connectivity to tenant devices and networks. The VNF provides the connectivity information to the gateway in order for the gateway to correctly route packets for the devices to the correct VNF for processing. In particular, the VNFs provide the connectivity information to the gateway as part of a routing control plane function. The routing control plane function allows devices in the network service provider data center to be configured with routing tables for each virtual tenant network, thereby ensuring that data packets are routed to the correct destinations within the service provider network. As part of the routing control plane function, devices in the service provider network, such as the VNF and gateway, need to be able to communicate with one another.

Conventionally, each VNF is configured to establish a separate session with the data center gateway to exchange such connectivity information in order to implement the routing control plane function. A session, as discussed herein, may refer to a Layer 4 or higher connection, such as a transmission control protocol (TCP) connection. In some examples, a session refers to a border gateway protocol (BGP) session over a TCP connection. A data center gateway is typically a physical device and may only be able to maintain a limited number of sessions simultaneously. Further, as the number of VNFs grows, maintaining additional sessions for receiving connectivity information from the VNFs uses up an increasing amount of processor power of the gateway. Thus, receiving connectivity information from the VNFs may become burdensome for the gateway.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The present disclosure provides an approach for scaling the number of VNFs in a data center without scaling the number of sessions between VNFs and a data center gateway. The approach includes establishing a session between a VNF and a route server in the data center, rather than between the VNF and the gateway directly, for the VNF to send connectivity information to the gateway. Multiple VNFs may establish sessions with the router server and send their connectivity information to the route server. The route server may establish one session with the gateway for communicating connectivity information for a plurality of VNFs, and send connectivity information corresponding to the plurality of VNFs to the gateway over the one session. It should be noted that the route server may establish a single session with the gateway for all VNFs, or separate sessions for separate sets of VNFs. The connectivity information is then used to update routing tables at the gateway, so that the gateway routes packets to the correct VNF for processing. The packets are communicated using three layers of networking: an underlay physical network, an overlay logical network, and a second overlay logical network, as further described below.

Figure 1:
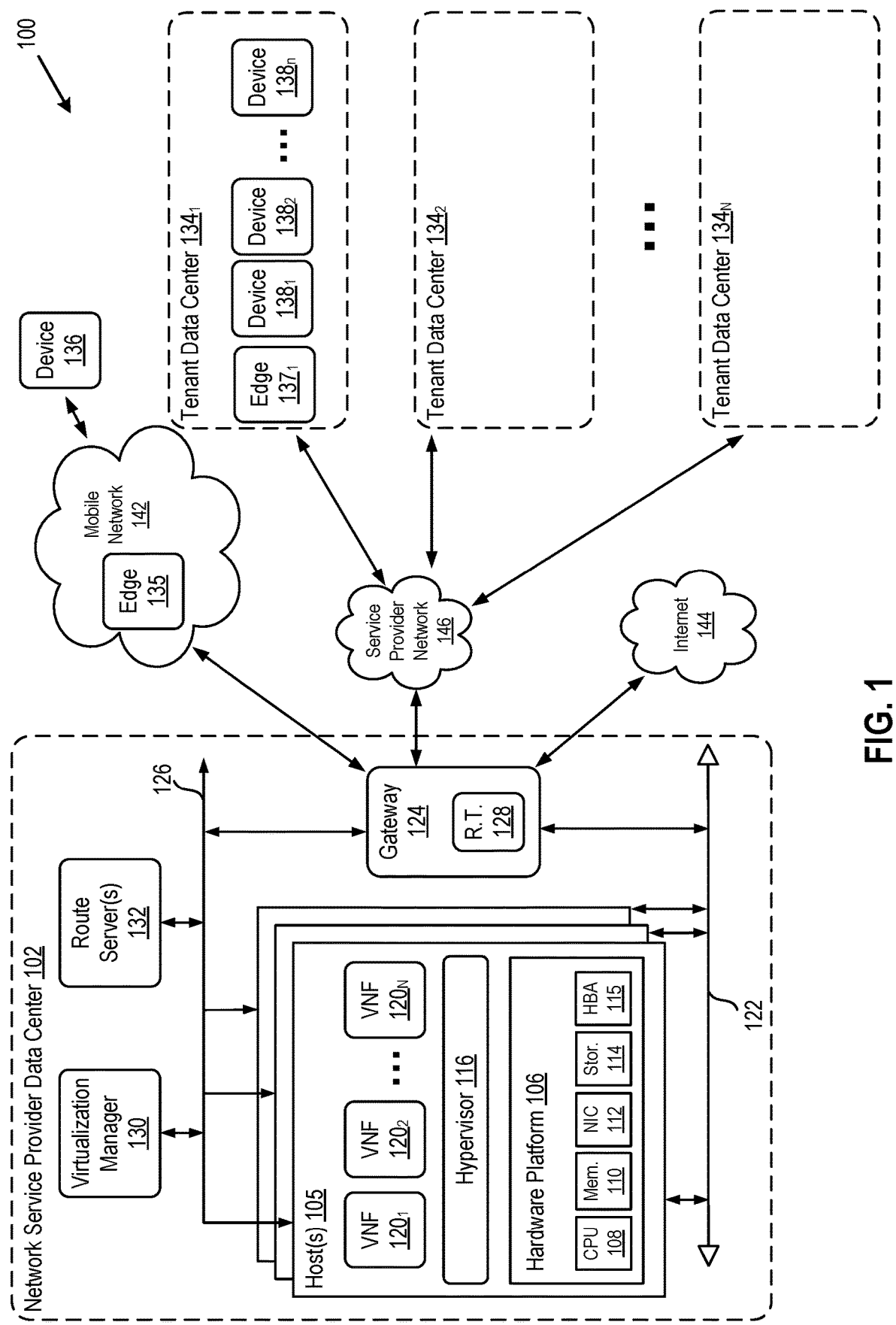
FIG. 1 depicts a block diagram of a computer system in which one or more embodiments of the present disclosure may be utilized, according to an embodiment.

FIG. 1 depicts a block diagram of a computer system 100 in which one or more embodiments of the present disclosure may be utilized, according to an embodiment. As shown, computer system 100 includes one or more devices 136, which may be mobile or stationary devices (e.g., mobile phones, tablets, laptops, home internet receiver, etc.) configured to communicate over a WWAN according to a cellular protocol (e.g., 3G, 4G, 5G, etc.). A device 136 is further configured to communicate with a mobile network 142. For example, the mobile network 142 includes one or more access points (not shown) with which device 136 can wirelessly communicate. Though mobile network 142 and device 136 are described with respect to a mobile network as an example, mobile network 142 may be any suitable type of network, and device 136 may be any device configured to implement any suitable protocol for communicating over network 142.

Computer system 100 further includes one or more tenant data centers 134. Each tenant data center 134 may be a data center corresponding to a different tenant of a network service provider. Each tenant data center 134 includes one or more devices 138 configured to communicate within a network, such as a local area network, provided by the corresponding tenant data center 134. A device 138 may be a computing device, such as a mobile device, server, workstation, laptop, etc.

Computer system 100 further includes a data center 102 belonging to the network service provider. The data center 102 may be part of or coupled to a service provider network 146 (e.g., WAN, LAN, etc.) provided by the network service provider. The service provider network 146 provides network connectivity for tenant devices of tenants of the network service provider. For example, service provider network 146 provides connectivity between devices 138 within tenant data center 134, devices on other networks such as Internet 144, and/or devices 136 on mobile network 142. In particular, a tenant may provide tenant devices that are part of different physical networks, such as devices 138 that are part of a corresponding tenant data center 134, devices 136 that are part of a mobile network 142, and/or devices part of the Internet. The tenant devices of the tenant, however, may be part of the same virtual tenant network, such as a VPN, and therefore each addressable using addressing (e.g., IP addresses) of the virtual tenant network. Each virtual tenant network may be associated with a different virtual network identifier (VNI) that uniquely identifies the virtual tenant network among virtual tenant networks of tenants of the network service provider.

Data center 102 includes host(s) 105, a virtualization manager 130, one or more route servers 132, a gateway 124, a management network 126, and a data network 122. Although the management and data network are shown as separate physical networks, it is also possible in some implementations to logically isolate the management network 126 from the data network 122 using different VLAN identifiers. Each of hosts 105 may be constructed on a server grade hardware platform 106, such as an x86 architecture platform. For example, hosts 105 may be geographically co-located servers on the same rack.

Hardware platform 106 of each host 105 may include components of a computing device such as one or more processors (CPUs) 108, system memory 110, a network interface 112, storage system 114, a local host bus adapter (HBA) 115, and other I/O devices such as, for example, a mouse and keyboard (not shown).

CPU 108 is configured to execute instructions, for example, executable instructions that perform one or more operations described herein and that may be stored in memory 110 and in storage 114. Network interface 112 enables host 105 to communicate with other devices via a communication medium, such as network 122 or network 126. Network interface 112 may include one or more network adapters, also referred to as Network Interface Cards (NICs), for connecting to one or more physical networks. In certain embodiments, data network 122 and management network 126 may be different physical networks as shown, and the hosts 105 may be connected to each of the data network 122 and management network 126 via separate NICs or separate ports on the same NIC. In certain embodiments, data network 122 and management network 126 may correspond to the same physical network, but different network segments, such as different subnets or different logical VLAN segments.

Storage system 114 represents local persistent storage devices (e.g., one or more hard disks, flash memory modules, solid state disks, and/or optical disks). HBA 115 couples host 105 to one or more external storages (not shown), such as a storage area network (SAN). Other external storages that may be used include network-attached storage (NAS) and other network data storage systems, which may be accessible via NIC 112.

Memory 110 is hardware allowing information, such as executable instructions, configurations, and other data, to be stored and retrieved. Memory 110 is where programs and data are kept when CPU 108 is actively using them. Memory 110 may be volatile memory or non-volatile memory. Volatile or non-persistent memory is memory that needs constant power in order to prevent data from being erased. Volatile memory describes conventional memory, such as dynamic random-access memory (DRAM). Non-volatile memory is memory that is persistent (non-volatile). Non-volatile memory is memory that retains its data after having power cycled (turned off and then back on). Non-volatile memory is byte-addressable, random access non-volatile memory.

In certain aspects, host 105 is configured to provide a virtualization layer or virtualization system/software, also referred to as a hypervisor 116, that abstracts processor, memory, storage, and networking resources of hardware platform 106 into one or more VNFs 120 (collectively referred to as VNFs 120 and individually referred to as VNF 120) that run concurrently on the same host. Accordingly, a VNF 120 may be implemented as a virtual machine (VM).

Although certain aspects are described with respect to VMs, it should be noted that the techniques discussed herein may similarly be applied to other types of virtual computing instances (VCIs) such as containers. For example, the processing functions of VNF 120 may be performed by one or more containers. The one or more containers may run within a VM on a guest operating system of the VM, or the one or more containers may directly run on an operating system of host 105. The one or more containers may be constructed in a service chain of containers. A service chain of containers is a sequence of containers, such that a packet passes through each container, and each container performs a specific processing function. For example, one container may perform an accounting function, another container may perform, a firewall function, while a third container may perform a parent control function.

Architecture of hypervisor 116 may vary. In some embodiments, a virtualization software can be installed as system level software directly on the server hardware (often referred to as "bare metal" installation) and be conceptually interposed between the physical hardware and the guest operating systems executing in the virtual machines. Alternatively, the virtualization software may conceptually run "on top of" a conventional host operating system in the server. In some implementations, the hypervisor may comprise system level software as well as a "Domain 0" or "Root Partition" virtual machine, which is a privileged machine that has access to the physical hardware resources of the host. In this implementation, a virtual switch, along with hardware drivers, may reside in the privileged virtual machine.

Virtualization manager 130 communicates with hosts 105 via a network, shown as a management network 126, and carries out administrative tasks for data center 102 such as managing hosts 105, managing local VMs such as VNFs 120 running within each host 105, provisioning VMs, migrating VMs from one host to another host, and load balancing between hosts 105. Virtualization manager 130 may be a computer program that resides and executes in a central server in data center 102 or, alternatively, virtualization manager 130 may run as a VM in one of hosts 105. VM migration discussed herein may be performed by VM migration methods known in the art, such as the method described in U.S. patent application Ser. No. 13/760,868, filed Feb. 6, 2013, or the method described in U.S. Pat. No. 9,870,324, issued Jan. 16, 2018. The entire contents of both of these documents are incorporated by reference herein.

As discussed, VNF 120 is a virtual processing device that processes packets sent between tenant devices via service provider network 146, such as between device 136 and device 138 of a virtual tenant network. For example, each tenant may have a separate service level agreement (SLA) with the network service provider. The SLA may specify rules, and optionally costs, for processing packets sent between tenant devices of the virtual tenant network or between tenant devices of different virtual tenant networks. Each tenant device may be registered with a particular VNF 120, meaning that VNF 120 is configured to process packets (e.g., inbound or outbound) of the tenant device. Accordingly, VNF 120 processes the packets according to the SLA of the tenant of the tenant device. The processing may include accounting, firewall filtering, parental control, load balancing, intrusion detection/prevention, routing functions, forwarding, network address translation, mobility, etc., as discussed. Accordingly, a VNF 120 may actively redirect packets, drop packets, or modify packets in a manner that goes beyond the behaviors of standard Layer 2 and Layer 3 forwarding devices such as switches and routers.

Each tenant device may be associated with processing rules (not shown) specific to that tenant device. The processing rules are stored on data center 102, such as in VNFs. The processing rules may specify the type of processing that is to be performed on packets passing through data center 102, the packets being sent by and/or to the tenant device with which the processing rules are associated.

Each VNF 120 is associated with a group of one or more tenant devices 136 and/or 138 for which VNF 120 processes packets. Each VNF 120 is associated with one or more corresponding virtual tenant networks for which VNF 120 processes packets. Accordingly, VNF 120 is configured with a separate routing table for each virtual tenant network the VNF 120 is associated in order to properly route packets for that virtual tenant network as will be discussed. For example, each virtual tenant network may be associated with a VNI, and a routing table corresponding to the virtual tenant network is also associated with the corresponding VNI.

When a new device 136/138 is registered with data center 102, device 136/138 is assigned to one of VNFs 120, such as based on a VNI associated with the device 136/138, as the device 136/138 currently does not have a tenant IP address. For example, multiple VNFs 120 may be associated with a VNI, and a particular VNF 120 is selected based on an appropriate technique such as a load balancing algorithm, round-robin, etc. The assigning may be performed by virtualization manager 130 and/or gateway 124. In certain aspects, VNF 120 assigns a tenant address (e.g., tenant IP address) corresponding to addressing in the virtual tenant network to the device 136/138 when the device registers with the VNF 120 as will be discussed.

Route server 132 peers with the VNFs 120 in order to learn connectivity information from each VNF 120. For example, route server 132 and each VNF 120 establish a session (e.g., BGP session) as part of implementing a routing control plane function. Route server 132 learns from each VNF 120 about connectivity information such as addresses (e.g., IP addresses) and prefixes (e.g., corresponding to subnets) of devices 136/138 that are reachable via the VNF 120 for the different virtual tenant networks.

Route server 132 further establishes a session with gateway 124, and sends the connectivity information of a plurality of VNFs 120 to the gateway 124 via the single session. Accordingly, gateway 124 can receive connectivity information for a plurality of VNFs 120 via a single session, instead of requiring establishment of multiple separate sessions for each VNF 120. Gateway 124 may create/update routing tables of the gateway 124 for each virtual tenant network as will be discussed based on the received connectivity information. Based on the received connectivity information, gateway 124 can now route traffic to the registered device 136/138.

VNF 120 notifies route server 132 when connectivity information of VNF 120 changes or when connectivity information is created, such as when a new device 136/138 registers with VNF 120, an address of a device 136/138 changes, a VNF 120 is created, or a VNF 120 is migrated. Data center 102 may have one or more route servers 132. Each route server 132 may be associated with a group of VNFs from which it receives connectivity information. Having a route server 132 forward connectivity information of VNFs allows gateway 124 to maintain less number of sessions. Route server 132 may be a physical device or a virtual computing instance, such as a VM running on one of hosts 105.

Gateway 124 provides VMs such as VNFs 120 and other components in data center 102 with connectivity to other networks such as mobile network 124, Internet 144, and/or tenant data centers 134 such as via network 146. In an embodiment, gateway 124 is a physical device that is capable of maintaining a limited number of control plane sessions with other components of data center 102. Gateway 124 may be a virtual computing instance, a physical device, or a software module running within host 105. It should be noted that for gateway 124 to process and route tenant data for tenant devices, gateway 124 does not need to establish control sessions such as with the VNFs 120. Further, gateway 124 may be able to handle the throughput of tenant data for a large number of tenant devices. However, gateway 124 may not be able to support separate sessions for the control plane for each of the VNFs 120 used to process the tenant data. Accordingly, the techniques herein advantageously reduce the number of control plane sessions gateway 124 needs to establish as part of a control plane function for the VNFs 120.

Gateway 124 may manage external public internet protocol (IP) addresses for components of data center 102, may route traffic incoming to and outgoing from data center 102, and may provide networking services, such as firewalls, network address translation (NAT), dynamic host configuration protocol (DHCP), and load balancing. Gateway 124 may use data network 122 to transmit data network packets to hosts 105. To receive connectivity information of VNFs 120, gateway 124 may establish a session with route server 132 rather than a session with each of a plurality of VNFs 120.

In an embodiment, gateway 124 receives VNF 120 connectivity information only from route server 132. In a second embodiment, gateway 124 may receive VNF 120 connectivity information from route server 132 and also directly from one or more VNFs 120. Gateway 124 may use the connectivity information to generate/update and store routing tables 128, which may be one or more files stored within storage accessible by gateway 124. Although only one gateway 124 is shown, data center 102 may have one or more gateways 124 through which network packets may reach data center 102.

Connectivity information may be transmitted to gateway 124 using BGP or using multiprotocol-BGP (MP-BGP). In an embodiment, BGP is defined by the Internet Engineering Task Force (IETF) Request for Comment (RFC) 4271 document, published in January 2006, as updated by RFC 6286, 6608, 6793, 7606, 7607, 7705, and 8212. In an embodiment, MP-BGP is defined by IETF RFC 4760 document, published January 2007, as updated by RFC 7606.

Similar to gateway 124, mobile network 142 includes an edge node 135 (e.g., physical device or VCI) that provides devices such as device 136 in mobile network 142 with connectivity to other networks such as data center 102 and/or network 146.

Similar to gateway 124, each tenant data center 134 includes an edge node 137 (e.g., physical device or VCI) that provides devices such as devices 138 in tenant data center 134 with connectivity to other networks such as data center 102 and/or network 146.

Figure 2:
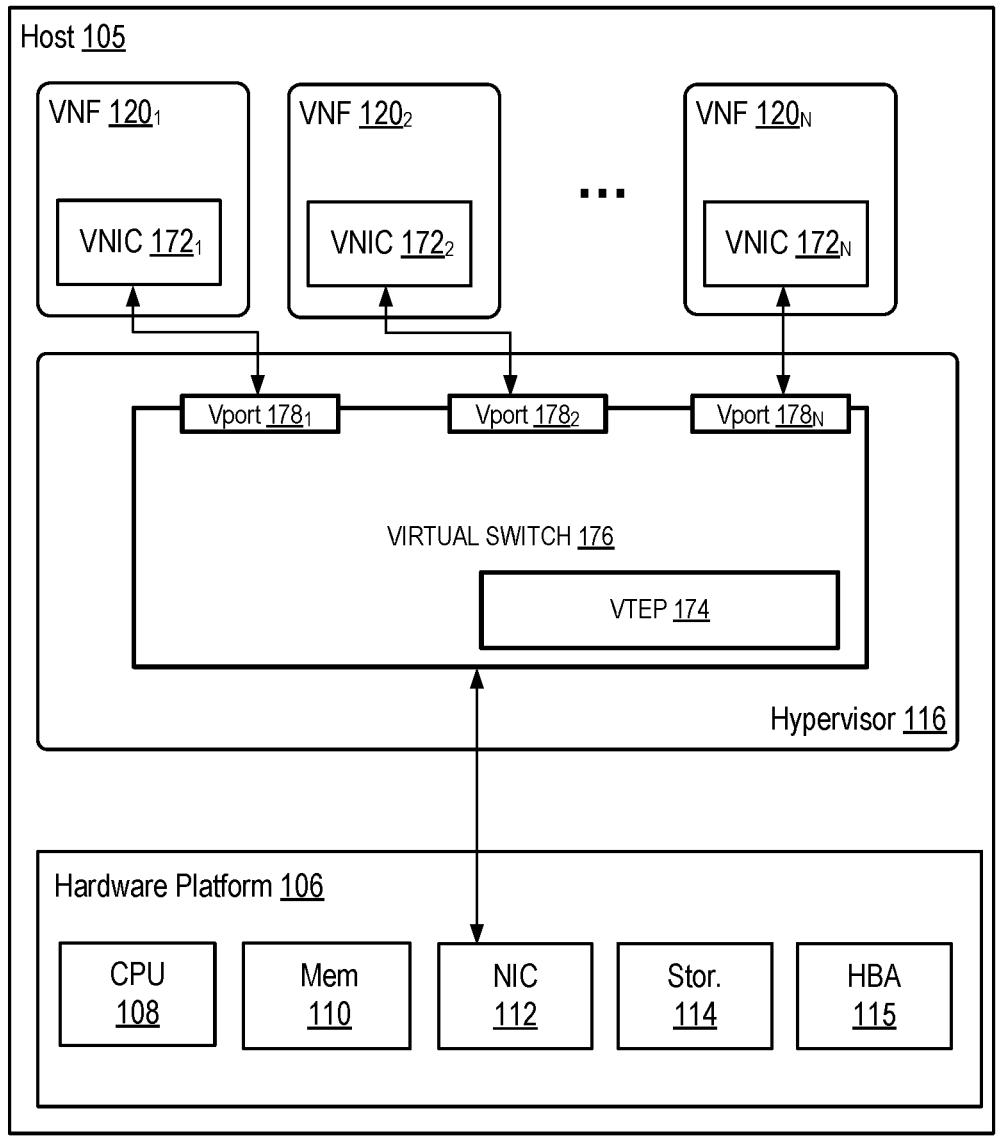
FIG. 2 is a block diagram showing a detailed view of a virtual switch of a hypervisor of a host, according to an embodiment.

FIG. 2 is a block diagram showing a detailed view of virtual switch 176 of host 105, according to an embodiment. Although virtual switch 176 is shown as located within hypervisor 116, in some cases, such as in a public cloud, it may not be possible to configure the virtual switch at the hypervisor layer. In these instances, it may be possible to include the virtual switch 176 (and VTEP 174) within each VM using an in-guest agent.

Virtual switch 176 may serve as an interface between the hosted VMs (e.g., VNFs 120), NIC 112, as well as between other resources available on a network to which host 105 is coupled, such as gateway 124. Hypervisor 116 further includes a hypervisor-based Virtual Extensible Local Area Network (VXLAN) tunnel endpoint (VTEP) 174 which may be implemented in software by virtual switch 176 (or outside of virtual switch 176 and functionally coupled to virtual switch 176 using forwarding tables). Accordingly, VTEP 174 is responsible for providing tunneling services for each of the VNFs 120 on the same host 105 as VTEP 174.

Depending on the hypervisor architecture, virtual switch 176, VTEP 174, and/or physical device drivers may execute in a privileged virtual machine (not shown) often referred to as a "Domain zero", "root-", or "parent-partition." Each of the VNFs 120 includes a virtual network interface card (vNIC) 172, which is responsible for exchanging packets between the VNFs 120 and hypervisor 116. vNICs 172 may be, in some cases, a software abstraction of a physical network interface card. Each VNF 120 is connected to vport 178 provided by virtual switch 176. Virtual switch 176 is connected to physical network interface 112 to allow network traffic to be exchanged between VNFs 120 and other network destinations, such as gateway 124.

A logical overlay network may be implemented by encapsulating data packets that are delivered through an underlying physical network. For example, gateway 124 may encapsulate a packet and send the generated packet to destination virtual switch 176 implemented in destination hypervisor 116 of destination host 105. Once destination host 105 receives the encapsulated packet, its network layer passes the encapsulated packet to its virtual switch 176 implementing the destination VTEP 174. The destination VTEP 174 then extracts the inner packet and virtual switch 176 uses the inner header of the decapsulated original packet to forward the original packet to the destination VNF 120. VTEP 174 may maintain the VM MAC-VTEP IP mapping of VXLAN networks to which its VMs (e.g., VNFs 120) connect, such as through traffic learning or through control plane implementation.

Returning to FIG. 1, system 100 may be regarded as comprising at least three networks: a physical underlay network, a first overlay logical network ("first overlay network"), and a second overlay logical network ("second overlay network"). As the packets are described with respect to processing by the VNFs 120 in data center 102, the physical underlay network refers to the data network 122 that couples together physical hosts 105. Further, the first overlay network refers to the overlay network implemented by, for example, virtual switches 176/VTEPs 174 to which VNFs 120 are coupled on hosts 105. Accordingly, the first overlay network couples together VNFs 120 and gateway 124. The second overlay network refers to the virtual tenant network for a given tenant. The first overlay network may be regarded as a "logical" underlay network for the second overlay network, meaning it is a logical network acting as an underlay for another logical network.

Within a packet, addressing information of the physical underlay network is included in underlay header 502 (see FIG. 5), addressing information of the first overlay network is included in first overlay header 504, and addressing information of the second overlay network is included in second overlay header 506. For each network, the addressing information may comprises source addresses (e.g., MAC and/or IP) and ports, destination addresses (e.g., MAC and/or IP) and ports, a VNI, and/or protocol identifier used for communication within that network. For example, the same IP address may be used in different networks by different devices, but an IP address in any given network should usually be unique to a device.

Figure 3:
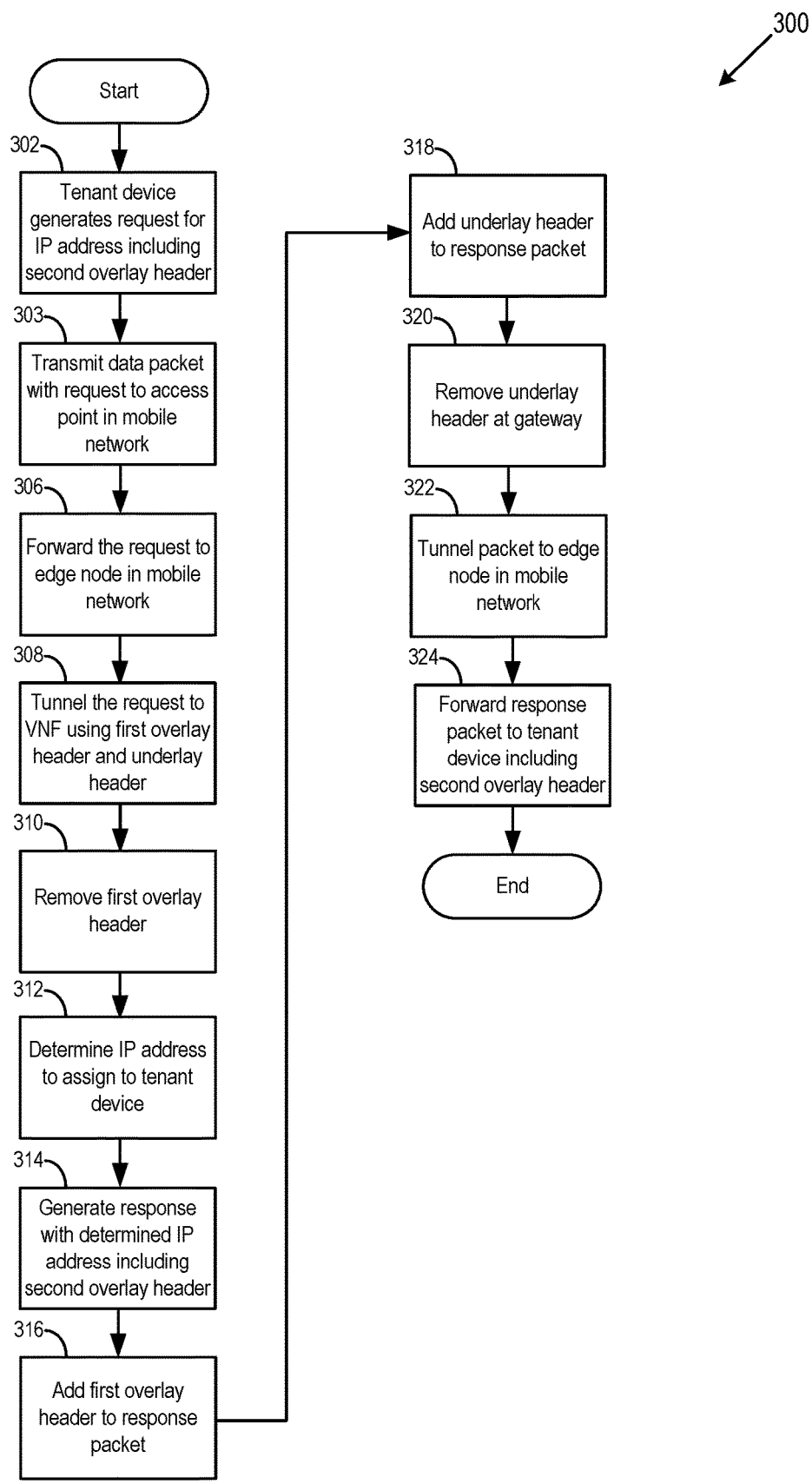
FIG. 3 depicts a flow diagram of a method of a device registering with a VNF, according to an embodiment
Figure 5:
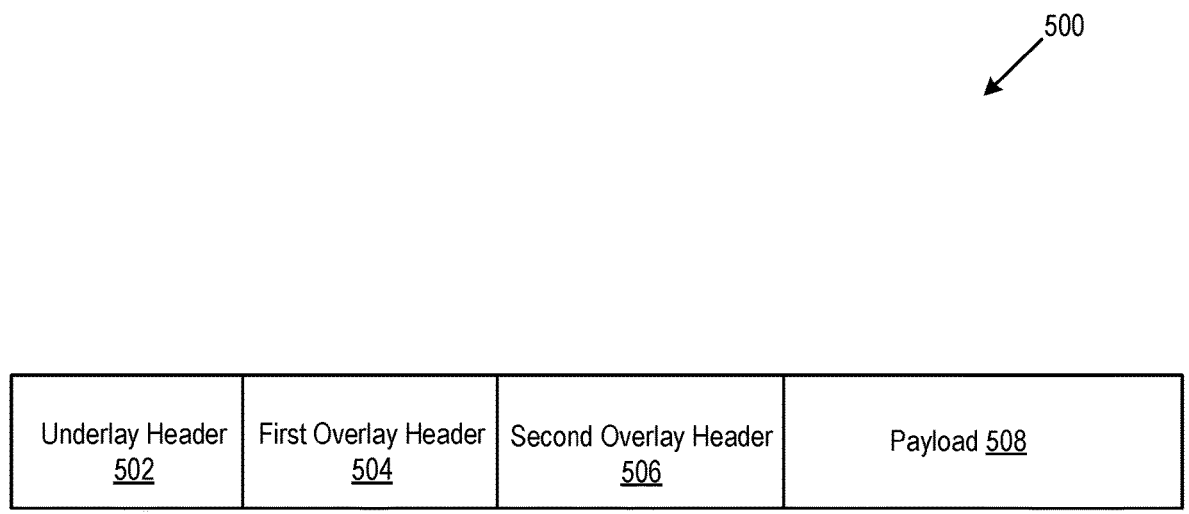
FIG. 5 depicts a block diagram of an exemplary data packet, according to an embodiment.

FIG. 3 depicts a flow diagram of a method 300 of a device registering with a VNF, according to an embodiment. Method 300 is described with reference to FIG. 5. FIG. 5 depicts a block diagram of an exemplary data packet 500, according to an embodiment.

At block 302, device 136 generates a request for an IP address in a virtual tenant network, such as similar to a DHCPDISCOVER message. The request may include in a header of the request a VNI of the virtual tenant network, an identifier (e.g., MAC address, etc.) of the device 136 (e.g., as a source MAC address), and a destination address (e.g., MAC and/or IP) corresponding to a broadcast address. The header may correspond to second overlay header 506. The header of the request and the payload (e.g., payload 508) of the request may be included in a payload or other portions of a data packet conforming to a communications protocol of the mobile network 142. At block 304, the device 136 transmits the data packet including the request to an access point in mobile network 142. At block 306, the mobile network 142 forwards the request to edge 135 as a default destination.

At block 308, edge 135 tunnels the request either directly to a VNF 120, or to gateway 124, which further tunnels the request to VNF 120. For example, edge 135 may be configured via a routing control plane function by gateway 124 with a routing table associated with the VNI having a default destination of the gateway 124 or the VNF 120 (e.g., where a given VNF 120 is associated with a given VNI). Accordingly, edge 135, based on the VNI included in the request determines an associated routing table. Then, using the routing table and based on the destination being a broadcast address, the edge 135 determines to encapsulate the packet and include a destination address for the request to be that of gateway 124 or VNF 120. The edge 135 is configured to encapsulate the request and add an overlay header to the request.

If tunneling to the VNF 120, the edge 135 adds first overlay header 504 to the packet and includes the IP address of VNF 120 from the routing table as the destination IP address and the IP address of the edge 135 as the source IP address in first overlay header 504. For example, edge 135 (e.g., a tunneling service of edge 135) may have an IP address associated with the first overlay network, such as in addition to IP addresses associated with other networks.

The edge 135 then transmits the packet to VNF 120. In certain aspects, gateway 124 is the default next hop destination for packets with an IP address of VNF 120. Accordingly, the packet passes to gateway 124. In certain embodiments, edge 135 tunnels the packet to gateway 124 via another tunnel (e.g., encapsulation header) that is added at edge 135 and removed at gateway 124 using addressing corresponding to another physical network between edge 135 and gateway 124.

The gateway 124 receives the packet, and based on the first overlay header 504 including a destination IP address of VNF 120, is configured with a routing table that indicates to encapsulate the packet and add underlay header 502 to the packet. In particular, gateway 124 adds in underlay header 502 a destination IP address of the host including the VNF 120, and a source IP address of the gateway 124 within the underlay network. For example, the gateway 124 may have an IP address associated with the underlay network, such as in addition to IP addresses associated with other networks. The packet is then transmitted over data network 122 to the host 105 including the VNF 120.

If instead tunneling to the gateway 124, the edge 135 may add first overlay header 504 to the packet and include the IP address of gateway 124 from the routing table as the destination IP address and the IP address of the edge 135 as the source IP address in first overlay header 504. The packet is then transmitted to gateway 124, which decapsulates the packet and removes first overlay header 504. In certain embodiments, edge 135 tunnels the packet to gateway 124 via another tunnel (e.g., encapsulation header) that is added at edge 135 and removed at gateway 124 using addressing corresponding to another physical network between edge 135 and gateway 124 instead of encapsulating using first overlay header 504.

Gateway 124 may be configured via a routing control plane function via route server 132 as discussed herein with a routing table associated with the VNI in second overlay header 506 having a default destination of the VNF 120 (e.g., where a given VNF 120 is associated with a given VNI). Accordingly, gateway 124, based on the VNI included in the request determines an associated routing table. Then, using the routing table and based on the destination being a broadcast address, the gateway 124 determines to encapsulate the packet and include a next destination address for the request to be that VNF 120.

In particular, gateway 124 adds first overlay header 504 to the packet and includes the IP address of VNF 120 from the routing table as the destination IP address and the IP address of the gateway 124 as the source IP address in first overlay header 504. For example, gateway 124 (e.g., a tunneling service of gateway 124) may have an IP address associated with the first overlay network. Further, gateway 124, based on the first overlay header 504 including a destination IP address of VNF 120, is configured with a routing table that indicates to encapsulate the packet and add underlay header 502 to the packet. In particular, gateway 124 adds in underlay header 502 a destination IP address of the host including the VNF 120, and a source IP address of the gateway 124 within the underlay network. For example, the gateway 124 may have an IP address associated with the underlay network, such as in addition to IP addresses associated with other networks such as the first overlay network. The packet is then transmitted over data network 122 to the host 105 including the VNF 120.

In both cases, the host 105 passes the packet to virtual switch 176, which forwards the packet to VTEP 174 for decapsulation based on the addressing in underlay header 502. VTEP 174 removes underlay header 502, and passes the packet back to virtual switch 176. Based on the addressing in first overlay header 504, the virtual switch 176 passes the packet to VNF 120 for processing.

At block 310, VNF 120 decapsulates the packet. In particular, VNF 120 removes the first overlay header. At block 312, VNF 120 determines an IP address to assign to device 136. In particular, VNF 120 is configured with a pool of IP addresses associated with the virtual tenant network associated with the VNI indicated in the second overlay header 506 of the packet. The VNF 120 may have been configured with the pool of IP addresses by virtualization manager 130, by learning such IP addresses from tenant data center 134, such as via a routing control plane function, etc.

At block 314, VNF 120 generates a response, such as similar to a DHCPOFFER message. The response includes the determined IP address, such as in a payload 508. A header of the response may correspond to the second overlay header 506, and include as a source address the IP address of VNF 120 as associated with the virtual tenant network (e.g., different than the IP address of the VNF 120 associated with the first overlay network), the VNI associated with the virtual tenant network, and as a destination address a broadcast address.

At block 316, the VNF 120 encapsulates the packet with the first overlay header 504. The first overlay header 504 includes as a source address the IP address of the VNF 120 as associated with the first overlay network and as a destination address the IP address associated with the first overlay network of either the edge 315 or gateway 124 from which the packet was tunneled.

At block 318, the VTEP 174, encapsulates the packet with the underlay header 502. For example, VNF 120 passes the packet to virtual switch 176, which based on the packet including a destination IP address of edge 315 or gateway 124 in the first overlay header 504, determines to pass the packet to VTEP 174. VTEP 174 determines the next destination is gateway 124 and adds underlay header 502 to the packet. Underlay header 502 includes as a source address the IP address of host 105, and as a destination address the IP address of gateway 124 associated with the underlay network. The packet is then passed to gateway 124.

At block 320, gateway 124 removes the underlay header 502. At block 322, gateway 124 tunnels the packet to edge 135, similar to as discussed for the tunneling from edge 135 to gateway 124. The first overlay header 504 may be removed at gateway 124, or at edge 135, depending on how the tunneling is performed similar to as discussed for the tunneling from edge 135 to gateway 124.

At block 324, the edge 135 forwards the packet including the second overlay header 506 to device 136. Accordingly, device 136 is assigned an IP address in the virtual tenant network.

Figure 4:
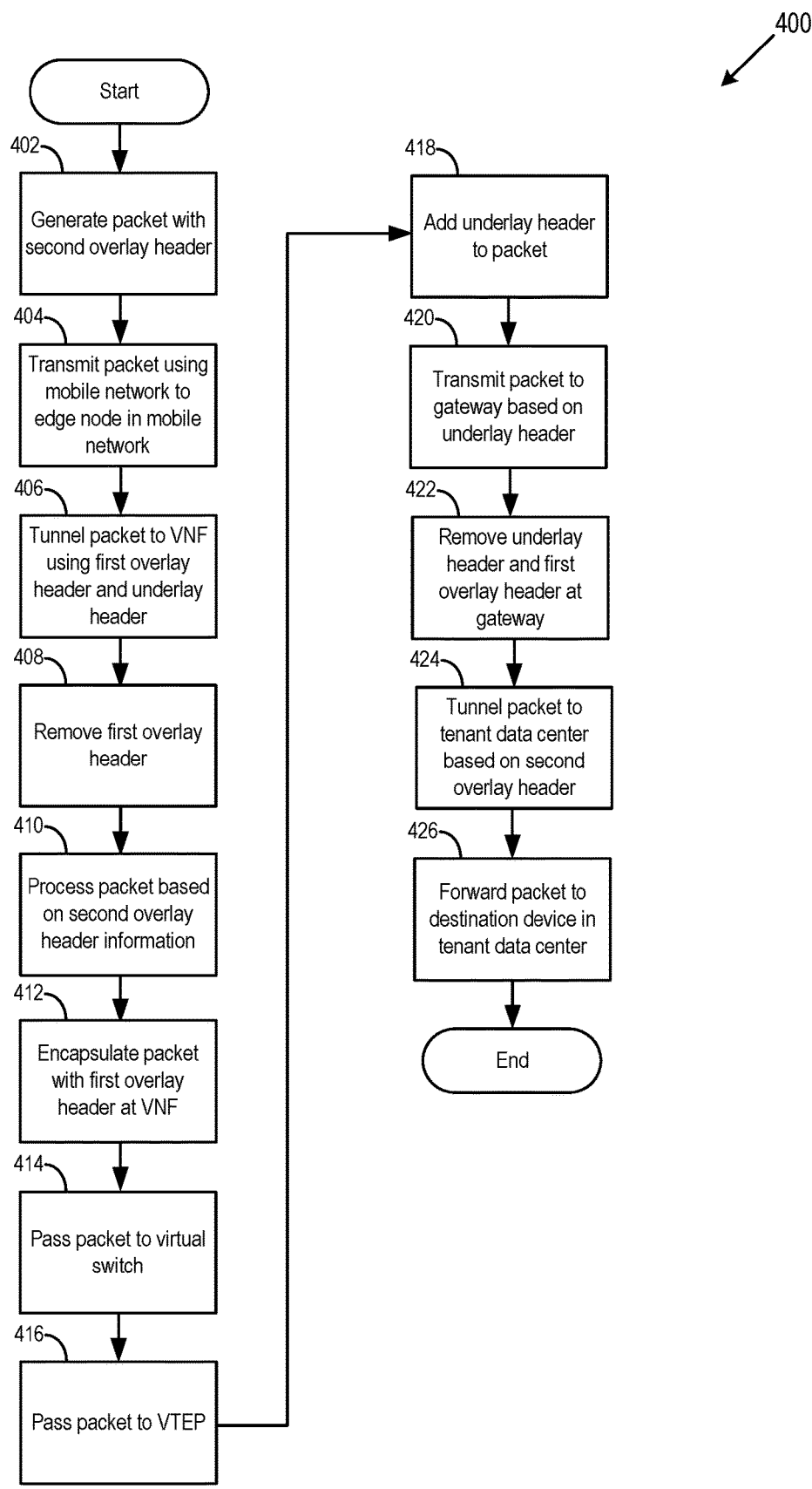
FIG. 4 depicts a flow diagram of a method of receiving, processing, and transmitting a packet, according to an embodiment.

FIG. 4 depicts a flow diagram of a method 400 of receiving, processing, and transmitting a packet, according to an embodiment. Method 400 is described with reference to FIG. 5. FIG. 5 depicts a block diagram of an exemplary data packet 500, according to an embodiment.

At block 402, device 136 generates a packet to transmit to device 138. Both device 136 and device 138 are part of the same virtual tenant network. The packet includes second overlay header 506, with a source address (e.g., MAC and/or IP) of device 136, a destination address (e.g., MAC and/or IP) of device 138, and a VNI of the virtual tenant network. The packet further includes payload 508. At block 404, the device 136 transmits the packet using the mobile network 142 communication protocol to the edge 135 via an access point of the mobile network 142 similar to as discussed with respect to blocks 304 and 306 of FIG. 3. In particular, the mobile network forwards the packet to the edge 135 as a default destination.

At block 406, edge 135 tunnels the packet either directly to the VNF 120 associated with the address of device 136, or to gateway 124, which further tunnels the request to VNF 120, similar to as discussed with respect to block 308. In particular, gateway 124, and in some embodiments edge 135, are configured with routing tables for one or more virtual tenant networks including the virtual tenant network associated with the VNI indicated in the packet, such as by route server 132 as discussed herein. For example, the routing table for the VNI indicated in the packet associates the IP address of device 136 with the IP address of the VNF 120 with which the device 136 registered to obtain an IP address according to method 300.

As discussed, either the edge 135 or gateway 124 adds the first overlay header 504 to the packet. The first overlay header 504 includes as a destination address the address of VNF 120 based on the routing table, and as a source address, the address of edge 135 or gateway 124 as associated with the first overlay network. Further, gateway 124 adds the underlay header 502 to the packet. The underlay header 502 includes as a destination address the address of the host 105 including the VNF 120, and as a source address the address of the gateway 124 as associated with the underlay network. The packet is then transmitted over data network 122 to the host 105 including the VNF 120.

The host 105 passes the packet to virtual switch 176, which forwards the packet to VTEP 174 for decapsulation based on the addressing in underlay header 502. VTEP 174 removes underlay header 502, and passes the packet back to virtual switch 176. Based on the addressing in first overlay header 504, the virtual switch 176 passes the packet to VNF 120 for processing.

At block 408, VNF 120 decapsulates the packet. In particular, VNF 120 removes the first overlay header 504. At block 410, VNF 120, based on the source and/or destination addresses in second overlay header 506, processes the packets as discussed, such as according to the processing rules.

At block 412, VNF 120 is configured to encapsulate the packet with the first overlay header 504 with a destination of gateway 124. In particular, VNF 120 includes a routing table indicating a default destination for the packet of gateway 124. The VNF 120 includes in the first overlay header 504 a source address of VNF 120 and a destination address of gateway 124 associated with the first overlay network.

At block 414, the VNF 120 passes the packet to virtual switch 176. At block 416, virtual switch 176 passes the packet to VTEP 174 based on forwarding tables at virtual switch 176 indicating the destination address in the first overlay header 504 is not present on host 105. At block 418, VTEP 174 encapsulates the packet with underlay header 502. The VTEP 174 includes in underlay header 502 a source address of host 105 and a destination address of gateway 124 associated with the underlay network based on forwarding tables at VTEP 174 mapping the destination address of gateway 124 associated with the first overlay network to the destination address of gateway 124 associated with the underlay network.

At block 420, the packet is transmitted over data network 122 to gateway 124. At block 422, gateway 124 removes underlay header 502 and first overlay header 504 from the packet as it is the destination of both the underlay network and the first overlay network. Accordingly, the remaining packet includes the second overlay header 506 and payload 508.

At block 424, gateway 124 tunnels the packet to tenant data center 134 including the device 138 indicated as the destination address in the second overlay header 506. For example, gateway 124 is configured with a routing table for the VNI indicated in second overlay header 506 that associates as a next destination for the IP address of device 138, edge 137 of tenant data center 134 including device 138. For example, gateway 124 may peer (e.g., using BGP or another routing control plane function) with each of edges 137 of tenant data centers 134 to learn connectivity information of each of the tenant data centers 134. In certain embodiments, gateway 124 tunnels the packet to edge 137 via another tunnel (e.g., encapsulation header) that is added at gateway 124 and removed at edge 137 using addressing corresponding to another physical network between edge 137 and gateway 124. At block 426, tenant data center 134 forward the packet to device 138.

As discussed, in order for gateway 124 to forward packets for processing to appropriate VNFs 120, gateway 124 is configured with routing tables that associate device IP addresses and corresponding VNIs with IP addresses of associated VNFs 120. For example, each VNF 120 provides its connectivity information to gateway 124. In particular, each VNF 120 may provide tenant IP addresses (e.g., individual IP address, prefixes of subnets, etc.) in one or more virtual tenant networks associated with corresponding VNIs as mapped to the IP address of VNF 120. The gateway 124, for a routing table associated with the VNI, may then map the tenant IP addresses to the IP address of VNF 120. In certain embodiments, to reduce the number of control plane sessions established by gateway 124, the VNFs 120 provide the connectivity information via route server 132.

Figure 6:
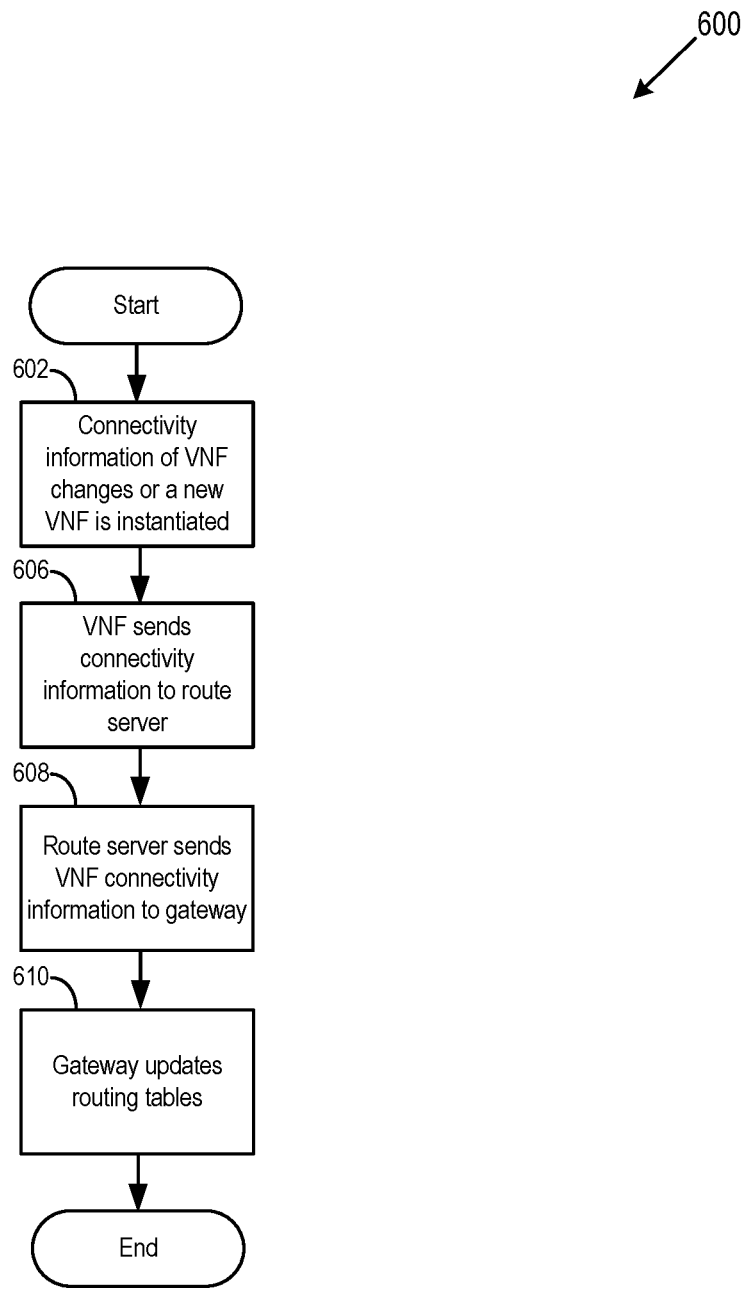
FIG. 6 depicts a flow diagram of a method of providing connectivity information of a VNF to a gateway, according to an embodiment.

FIG. 6 depicts a flow diagram of a method 600 of providing connectivity information of VNF 120 to gateway 124, according to an embodiment.

At block 602, connectivity information of VNF 120 changes or a new VNF 120 is created on one of hosts 105. For example, an IP address of a tenant device associated with a VNF 120 changes, a new tenant device registers and is assigned an IP address by VNF 120, an IP address of VNF 120 changes, etc. A new VNF 120 may be created if, for example, virtualization manager 130 determines that the existing VNFs 120 are overburdened with packet processing tasks and that one or more additional VNFs 120 should be instantiated to process data packets incoming into data center 102. VNF 120 may be instantiated by virtualization manager 130.

At block 606, VNF 120 transmits its new or updated connectivity information to route server 132. In an embodiment, when VNF 120 is transmitting connectivity information to route server 132, VNF 120 has an open session with route server 132 but not with gateway 124.

At block 608, route server 132 transmits connectivity information of VNF 120 to gateway 124. The connectivity information route server 132 transmits is the connectivity information received at block 606. The connectivity information transmitted in blocks 606 and 608 may be transmitted to gateway 124 using BGP or MP-BGP.

At block 610, gateway 124 receives connectivity information of VNF 120. Gateway 124 updates its routing tables 128 based on the received connectivity information of VNF 120. After block 610, method 600 ends.

It should be noted that, in an embodiment, route server 132 may have a plurality of sessions open with a plurality of VNFs 120 while performing block 606 for each of the VNFs 120. However, only a single session may exist between route server 132 and gateway 124. The single session is used to transmit, from route server to gateway 124, connectivity information received by route server 132 from a plurality of VNFs 120.

The present approach is a technical solution to a technical problem, with the practical application of providing connectivity information to a gateway of a data center. The present approach allows scaling the number of VNFs 120 without overwhelming gateway 124 with maintaining multiple sessions, which is a specific function improving computer technology and the functioning of the computer (e.g., gateway 124) itself.

It should be understood that, for any process described herein, there may be additional or fewer steps performed in similar or alternative orders, or in parallel, within the scope of the various embodiments, consistent with the teachings herein, unless otherwise stated.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system—level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method of processing a packet, the method comprising:
   establishing, by a plurality of virtual network functions (VNFs), a plurality of control plane sessions comprising a separate control plane session between a route server and each of the plurality of VNFs;
   receiving, by the route server, VNF connectivity information from the plurality of virtual network functions (VNFs) via the plurality of control plane sessions;
   transmitting, by the route server, the VNF connectivity information of the plurality of VNFs to a gateway of a data center via a single control plane session, wherein the route server has established the single control plane session with the gateway;
   receiving a packet from a first device, the packet comprising a first header and a payload, the first header comprising a source address comprising an address of the first device in a virtual tenant network and a destination address comprising an address of a second device in the virtual tenant network;
   based on the VNF connectivity information indicating at least one of the address of the first device and the address of the second device is associated with a VNF of the plurality of VNFs, determining that the VNF is assigned to process the packet;
   based on the VNF connectivity information, adding a second header to the packet, the second header indicating:
      a second destination address comprising an address of the VNF in a second network that uses different addressing than the virtual tenant network; and
      a second source address comprising an address of a tunneling service of the gateway in the second network;
   determining a host on which the VNF is executing;
   adding a third header to the packet, the third header indicating:
      a third destination address comprising an address of the host in a third network that uses different addressing than the virtual tenant network and the second network; and
      a third source address comprising an address of the gateway in the third network;
   transmitting the packet to the host, wherein the gateway routes the packet between the first device and the host; and
   processing the packet by the VNF.

2. The method of claim 1, the method further comprising, subsequent to the transmitting of the packet to the host:
   receiving the packet by a virtual switch of the host;
   removing the third header at the host; and
   based on the second header, transmitting by the virtual switch the packet to the VNF.

3. The method of claim 1, the method further comprising:
   based on the first header, determining by the VNF one or more processing rules; and
   performing the processing of the packet according to the one or more processing rules.

4. The method of claim 1, wherein the VNF connectivity information is transmitted to the route server by the plurality of VNFs using a gateway protocol, wherein the gateway protocol is one of border gateway protocol (BGP) or multiprotocol-BGP (MP-BGP).

5. The method of claim 1, wherein the processing of the packet by the VNF comprises at least one of: firewall filtering, parental control filtering, accounting, load balancing, routing, forwarding, network address translation, or intrusion detection or prevention.

6. The method of claim 1, wherein the gateway is a physical device.

7. The method of claim 1, wherein:
   the third network comprises an underlay physical network;
   the second network comprises a first overlay logical network;
   the virtual tenant network comprises a second overlay logical network; and
   the first overlay logical network services as a logical underlay network for the second overlay logical network.

8. A non-transitory computer readable medium comprising instructions to be executed by one or more processors of a computer system, the instructions when executed by the one or more processors cause the computer system to carry out a method of processing a packet, the method comprising:
   establishing, by a plurality of virtual network functions (VNFs), a plurality of control plane sessions comprising a separate control plane session between a route server and each of the plurality of VNFs;
   receiving, by the route server, VNF connectivity information from the plurality of virtual network functions (VNFs) via the plurality of control plane sessions;

transmitting, by the route server, the VNF connectivity information of the plurality of VNFs to a gateway of a data center via a single control plane session, wherein the route server has established the single control plane session with the gateway;

receiving a packet from a first device, the packet comprising a first header and a payload, the first header comprising a source address comprising an address of the first device in a virtual tenant network and a destination address comprising an address of a second device in the virtual tenant network;

based on the VNF connectivity information indicating at least one of the address of the first device and the address of the second device is associated with a VNF of the plurality of VNFs, determining that the VNF is assigned to process the packet;

based on the VNF connectivity information, adding a second header to the packet, the second header indicating:
- a second destination address comprising an address of the VNF in a second network that uses different addressing than the virtual tenant network; and
- a second source address comprising an address of a tunneling service of the gateway in the second network;

determining a host on which the VNF is executing;

adding a third header to the packet, the third header indicating:
- a third destination address comprising an address of the host in a third network that uses different addressing than the virtual tenant network and the second network; and
- a third source address comprising an address of the gateway in the third network;

transmitting the packet to the host, wherein the gateway routes the packet between the first device and the host; and processing the packet by the VNF.

9. The non-transitory computer readable medium of claim 8, the method further comprising, subsequent to the transmitting of the packet to the host:
receiving the packet by a virtual switch of the host;
removing the third header at the host; and
based on the second header, transmitting by the virtual switch the packet to the VNF.

10. The non-transitory computer readable medium of claim 8, the method further comprising:
based on the first header, determining by the VNF one or more processing rules; and
performing the processing of the packet according to the one or more processing rules.

11. The non-transitory computer readable medium of claim 8, wherein the VNF connectivity information is transmitted to the route server by the plurality of VNFs using a gateway protocol, wherein the gateway protocol is one of border gateway protocol (BGP) or multiprotocol-BGP (MP-BGP).

12. The non-transitory computer readable medium of claim 8, wherein the processing of the packet by the VNF comprises at least one of: firewall filtering, parental control filtering, accounting, load balancing, routing, forwarding, network address translation, or intrusion detection or prevention.

13. The non-transitory computer readable medium of claim 8, wherein the gateway is a physical device.

14. A computer system comprising:
one or more processors, wherein the one or more processors are configured to carry out a method of processing a packet, the method comprising:
establishing, by a plurality of virtual network functions (VNFs), a plurality of control plane sessions comprising a separate control plane session between a route server and each of the plurality of VNFs;

receiving, by the route server, VNF connectivity information from the plurality of virtual network functions (VNFs) via the plurality of control plane sessions;

transmitting, by the route server, the VNF connectivity information of the plurality of VNFs to a gateway of a data center via a single control plane session, wherein the route server has established the single control plane session with the gateway;

receiving a packet from a first device, the packet comprising a first header and a payload, the first header comprising a source address comprising an address of the first device in a virtual tenant network and a destination address comprising an address of a second device in the virtual tenant network;

based on the VNF connectivity information indicating at least one of the address of the first device and the address of the second device is associated with a VNF of the plurality of VNFs, determining that the VNF is assigned to process the packet;

based on the VNF connectivity information, adding a second header to the packet, the second header indicating:
- a second destination address comprising an address of the VNF in a second network that uses different addressing than the virtual tenant network; and
- a second source address comprising an address of a tunneling service of the gateway in the second network;

determining a host on which the VNF is executing;

adding a third header to the packet, the third header indicating:
- a third destination address comprising an address of the host in a third network that uses different addressing than the virtual tenant network and the second network; and
- a third source address comprising an address of the gateway in the third network;

transmitting the packet to the host, wherein the gateway routes the packet between the first device and the host; and processing the packet by the VNF.

15. The computer system of claim 14, the method further comprising, subsequent to the transmitting of the packet to the host:
receiving the packet by a virtual switch of the host;
removing the third header at the host; and
based on the second header, transmitting by the virtual switch the packet to the VNF.

* * * * *